United States Patent
Li et al.

(10) Patent No.: US 11,927,504 B2
(45) Date of Patent: Mar. 12, 2024

(54) NON-DESTRUCTIVE TESTING METHOD FOR TIGHTNESS DEGREE OF SMALL CIGARETTE BOX PACKAGING

(71) Applicant: ZHENGZHOU TOBACCO RESEARCH INSTITUTE OF CNTC, Zhengzhou (CN)

(72) Inventors: Bin Li, Zhengzhou (CN); Yue Sun, Zhengzhou (CN); Le Wang, Zhengzhou (CN); Guangyang Qiu, Zhengzhou (CN); Mingjian Zhang, Zhengzhou (CN); Ran Chen, Zhengzhou (CN); Ke Zhang, Zhengzhou (CN); Nan Deng, Zhengzhou (CN)

(73) Assignee: ZHENGZHOU TOBACCO RESEARCH INSTITUTE OF CNTC, Zhengzhou (CN)

( * ) Notice: Subject to any disclaimer, the term of this patent is extended or adjusted under 35 U.S.C. 154(b) by 399 days.

(21) Appl. No.: 17/418,726

(22) PCT Filed: Jul. 22, 2020

(86) PCT No.: PCT/CN2020/103435
§ 371 (c)(1),
(2) Date: Jun. 25, 2021

(87) PCT Pub. No.: WO2021/036593
PCT Pub. Date: Mar. 4, 2021

(65) Prior Publication Data
US 2022/0065733 A1 Mar. 3, 2022

(30) Foreign Application Priority Data
Aug. 26, 2019 (CN) .......................... 201910788793.0

(51) Int. Cl.
*G01M 3/32* (2006.01)

(52) U.S. Cl.
CPC .................................... *G01M 3/32* (2013.01)

(58) Field of Classification Search
CPC .... G01M 3/32; G01M 3/3281; G01M 3/3272; G01M 3/329; G01M 3/34; G06F 17/10
See application file for complete search history.

(56) References Cited

U.S. PATENT DOCUMENTS

| 7,707,871 | B2 * | 5/2010 | Lukens | G01M 3/229 |
| | | | | 73/40.7 |
| 9,857,264 | B2 * | 1/2018 | Watanabe | G01M 3/20 |
| 2005/0223779 | A1 * | 10/2005 | Perkins | G01M 3/202 |
| | | | | 73/40.7 |

FOREIGN PATENT DOCUMENTS

CN 111323183 A * 6/2020 ............ G01M 3/329

* cited by examiner

*Primary Examiner* — An H Do
(74) *Attorney, Agent, or Firm* — Lewis Roca Rothgerber Christie LLP

(57) ABSTRACT

The application proposes a non-destructive testing method for the sealing degree of the small cigarette box packaging, which includes placing the small cigarette box to be tested in an airtight chamber, using a balance cabin to quickly form a stable negative pressure in the airtight chamber; The pressure change of the sealed chamber is continuously measured until equilibrium, and the data model is analyzed and established by using Darcy's law, Fick's diffusion law and the physical process of molecular kinetic theory. Through the non-destructive testing method for the sealing degree of the small cigarette box packaging of the present invention, the traditional destructive measurement (damaged small box packaging) for measuring the sealing degree of cigarette small box is changed into non-destructive testing; The test results have specific physical meaning; The test time of a single sample is reduced to ⅕ of the time of destructive test.

6 Claims, 3 Drawing Sheets

NON-DESTRUCTIVE TESTING METHOD FOR TIGHTNESS DEGREE OF SMALL CIGARETTE BOX PACKAGING

CROSS-REFERENCE TO RELATED APPLICATION(S)

This application is a U.S. National Phase Patent Application of PCT/CN2020/103435, filed Jul. 22, 2020, which claims priority to Chinese patent application 201910788793.0, filed on Aug. 26, 2019, the entire content of each of which is hereby incorporated by reference.

TECHNICAL FIELD

The present invention relates to the field of cigarette quality testing and more particularly to a non-destructive determination of cigarette packet's seal.

BACKGROUND OF THE INVENTION

Cigarette packaging is the last production procedure of finished cigarettes. With the development of production technology, the cigarette packaging process mainly uses machines to seal the folds at both ends of cigarette packet. When cigarettes with bad seal are stored for a long time, mildew will appear in humid environments, and the cigarettes will become dry and fragile in dry climates. At the same time, the aroma of cigarettes will also leak in a large amount, which directly affects consumers' benefits and credibility of cigarette manufacturers. In recent years, some consumers have indicated that some cigarettes have mildew and dry cracking. It can be seen that measuring the seal of cigarette packet is crucial to improve the cigarette packaging technology and increase the seal of cigarette packet.

Seal detection was first applied to military products, and seal is one of the essential measures to ensure the reliable function of military products after long-term storage. With economic development and technological progress, people have put forward higher and higher requirements for the performance and quality of packaging, and corresponding national standards have also been set for the seal of some products. In terms of seal testing for packaging, there are existing methods such as inflation method, visual method, talc method, sealing performance tester and bubble method.

The inflation method is widely used. ASTM (American Society for Testing and Materials) F2095 describes a method that measures the seal of the package by inflating the inside of the package and gradually attenuating the pressure, which is a destructive detection method. And at the same time, the pressure control of the inflation has a significant impact on the detection result (the expression of the average leakage rate). This is a destructive testing method and is suitable for the testing of cigarette's soft packet. For cigarette's hard packet with boundary restrictions, the inflation test cannot be applied, nor can it be applied to the seal test of cigarette packet.

In 1998, the State Tobacco Monopoly Administration promulgated the industry standard YC/T140-1998 *Inflation Testing Method for the Sealing Degree of Cigarette Packets*. This method is only suitable for the seal measurement of cigarette's soft packet, and the test accuracy is not high. This method was abolished in 2013.

The above-mentioned methods are not suitable for the seal detection of cigarette packet. The Chinese Patent (Publication No.: CN 104792470 A) describes a method for measuring the seal of cigarette packet, which is based on pressure sensing of cigarette packet sealing and can identify the location of the leak. However, this method requires punching and positioning of the cigarette packets. After the measurement, the cigarette packets cannot be recycled and there is a risk of being mixed into normal cigarette packs. In addition, the measurement chamber needs to be evacuated at a constant flow rate during measurement, which may cause damage to the cigarette packets film and affect the measurement accuracy of the seal of cigarette packet. This method is also a destructive method for detecting the seal of cigarette packet.

SUMMARY OF THE INVENTION

In order to overcome the above-mentioned drawbacks of the prior art, the present invention proposes a non-destructive determination of cigarette packet's seal. By means of Darcy's law which reflects the basic law of pressure difference and flow velocity in porous media, and Fick's law of diffusion of gas in the presence of a concentration gradient, this method establishes a data model through the physical process analysis of molecular kinematics (gas state equation) and obtains the results the seal, thus realizes non-destructive testing.

A non-destructive determination of cigarette packet's seal, includes

Placing the cigarette packet under test in an airtight chamber, and using the balance cabin to make the airtight chamber quickly form a stable negative pressure (between −3500 Pa-5000 Pa, the operation time is less than 5 s);

Continuing to measure the pressure change in the airtight chamber until it reaches the balance, and using Darcy's law, Fick's law of diffusion and the physical process of kinetic molecular theory to establish and analyze the data model;

Based on the data of pressure and time in the sealed space, three indicators are obtained. Among them, the effective air permeability of cigarette packet (unit: cm/min, namely CORESTA), applies the principle of a linear relationship between the pressure drop and the flow rate-Darcy's law when the gas flows through the porous media; the effective diffusion coefficient of cigarette packet "k" (unit: $m^2/s$), applies the principle of the mass flux and the concentration gradient showing a linear relationship-Fick's law of diffusion when the pressure difference or concentration is used as the driving force; the effective leakage area of cigarette packet is "A" (the unit: $m^2$), applies the principle lies in the constant mass balance of the amount of matter passing through the leak point or the equation of state of the gas-the theory of molecular kinetics. The three indicators can independently reflect different degrees of seal of the cigarette package. The larger the three data values, the worse the seal.

The detection device of the non-destructive determination of cigarette packet's seal includes:

Pressure regulating valve, vacuum generator, balance cabin, pressure gauge, airtight chamber, cigarette packet, differential pressure sensor and computer, One end of the vacuum generator is connected with a pressure regulating valve, and the other end is connected with a muffler; wherein, the pressure regulating valve is connected with an air source;

The vacuum generator is sequentially connected with a first shut-off valve, a balance cabin, a pressure gauge, a second shut-off valve, an airtight chamber, a cigarette packet, a pressure difference sensor and a computer.

During the detection process, (1 Before starting the test, prepare a tank with a certain vacuum degree of balance chamber, turn on the air supply, and close the shut-off valve;

(2 Turn on the first shut-off valve and slowly turn the pressure regulating valve. At this time, the vacuum pressure generator is working and the balance cabin produces negative pressure; continue to turn the pressure regulating valve to make the pressure gauge display between −3500 Pa and −5000 Pa. After the pointer of the pressure gauge is stable, close the first shut-off valve. At this time, the negative pressure of the balance cabin is equal to the value shown on the pressure gauge;

(3 Open the airtight chamber, place the cigarette packet in it, and then close and seal the airtight chamber;

(4 turn on the computer, open the data acquisition software, connect to the output signal of the micro-pressure sensor, and set the data acquisition frequency to 10 Hz.

(5 Click the data acquisition software to start collecting data, and then immediately open the second shut-off valve and quickly close it (in 2 s~4 s). When the measured pressure value $P_t$ is stable, stop collecting the data, export and save the data, and then open the measurement room to take out the cigarette packet. Complete the seal measurement of cigarette packet; after continuously measuring several groups of cigarette packet, when the negative pressure value shown on the pressure gauge is greater than −3500 Pa, repeat the steps;

(6 Save the measurement data. According to the data, the external volume of cigarette packet $V_1$, the final pressure $P_e$ of the airtight chamber, the measured pressure $P_t$ of the airtight chamber, the time t, and the initial pressure $P_{t0}$ of the airtight chamber, three models are used to calculate the data to obtain the effective air permeability " " of cigarette packet. The effective diffusion coefficient of cigarette packet "k" and the effective leakage area of cigarette packet "A" are three indicators to obtain the seal of the cigarette packet;

The effective air permeability of cigarette packet "α", the effective diffusion coefficient "k" of cigarette packet and the effective leakage area "A" of cigarette packet can independently reflect the seal of cigarette packet. The larger the value, the worse the seal.

Through the non-destructive determination of cigarette packet's seal of the present invention, the traditional destructive measurement (damaged cigarette packet) for measuring the seal of cigarette packet is changed into non-destructive testing; the test results indicate specific physical meanings, making the initial the negative pressure being controlled within a range and the data obtained with excellent repeatability; the test time of a single sample is reduced to ⅕ of the time used for destructive testing.

DETAILED DESCRIPTION OF THE EMBODIMENTS

The following describes in further detail a method for non-destructive determination of cigarette packet's seal provided by the present invention with reference to the accompanying drawings and specific embodiments thereof.

A method for non-destructive determination of cigarette packet's seal, which includes placing the tested cigarette packets in an airtight chamber, and make use of a balance cabin body to quickly form a stable negative pressure in the airtight chamber;

Continue to measure the pressure change in the sealed chamber until it reaches equilibrium, and use Darcy's law, Fick's law of diffusion and the physical process of kinetic molecular theory to analyze and establish a data model;

Based on the data of the pressure and time of the sealed space, three indicators of physical significance of the effective air permeability of cigarette packet, the effective diffusion coefficient of cigarette packet g and the effective leakage area of cigarette packet are obtained. The three indicators can independently reflect different seal. The larger the three data values, the worse the seal.

Figure 1:
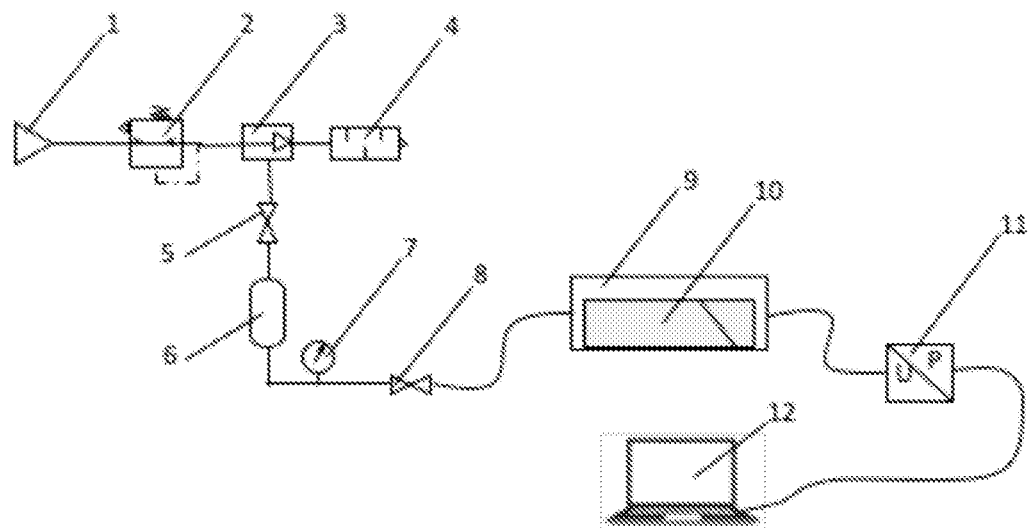
FIG. 1 shows a schematic diagram of a non-destructive testing device for the seal of cigarette packet.

As shown in FIG. 1, the detection device of the non-destructive determination of cigarette packet's seal includes the pressure regulating valve 2, the vacuum generator 3, the balance chamber 6, the pressure gauge 7, the airtight chamber 9, the cigarette packet 10, and the micro pressure Difference sensor 11 and computer 12, One end of the vacuum generator 3 is connected to a pressure regulating valve 2, and the other end is connected to a muffler 4; wherein, the pressure regulating valve 2 is connected to the air source 1;

The vacuum generator 3 is connected to the first shut-off valve 5, the balance cabin 6, the pressure gauge 7, the second shut-off valve 8, the airtight chamber 9, the cigarette packet 10, the differential pressure sensor 11 and the computer 12 in sequence.

The specific implementation steps are as follows:

(1 Before starting the test, prepare a tank of balance chamber 6 with a certain degree of vacuum. Open the air supply 1, and close the second shut-off valve 8.

(2 Open the first shut-off valve 5, and slowly screw the pressure regulating valve 2 by hand. At this time, the vacuum generator 3 works and the balance cabin 6 produces negative pressure. The function of the muffler 4 is to reduce the noise generated when the vacuum generator 3 is working. Continue to screw the pressure regulating valve 2 to make the pressure gauge 7 display between −3500 Pa and −5000 Pa. After the pointer of the pressure gauge 7 is stable, close the first shut-off valve 5. At this time, the negative pressure of the balance cabin 6 is equal to the value shown in the pressure gauge 7.

(3 Open the airtight chamber 9, place a cigarette pack 10 of a certain brand in the airtight chamber 9, and then close and seal the airtight chamber 9.

(4 Start the computer 12, open the data acquisition software and connect to the output signal of the micro-pressure sensor 11, and set the data acquisition frequency to 10 Hz.

(5 Click the "Start" button of the data acquisition software to start collecting data, then immediately open the second shut-off valve 8, then quickly close it (in 2 s~4 s), when the measured pressure value Pt is stable, stop collecting the data, export and save the data, and then open the airtight chamber 9 and take out the cigarette pack 10, and completes the seal measurement of cigarette packet. After continuously measuring several sets of cigarette pack, repeat step (2) when the negative pressure value shown on the pressure gauge 7 is greater than −3500 Pa.

Figure 2:
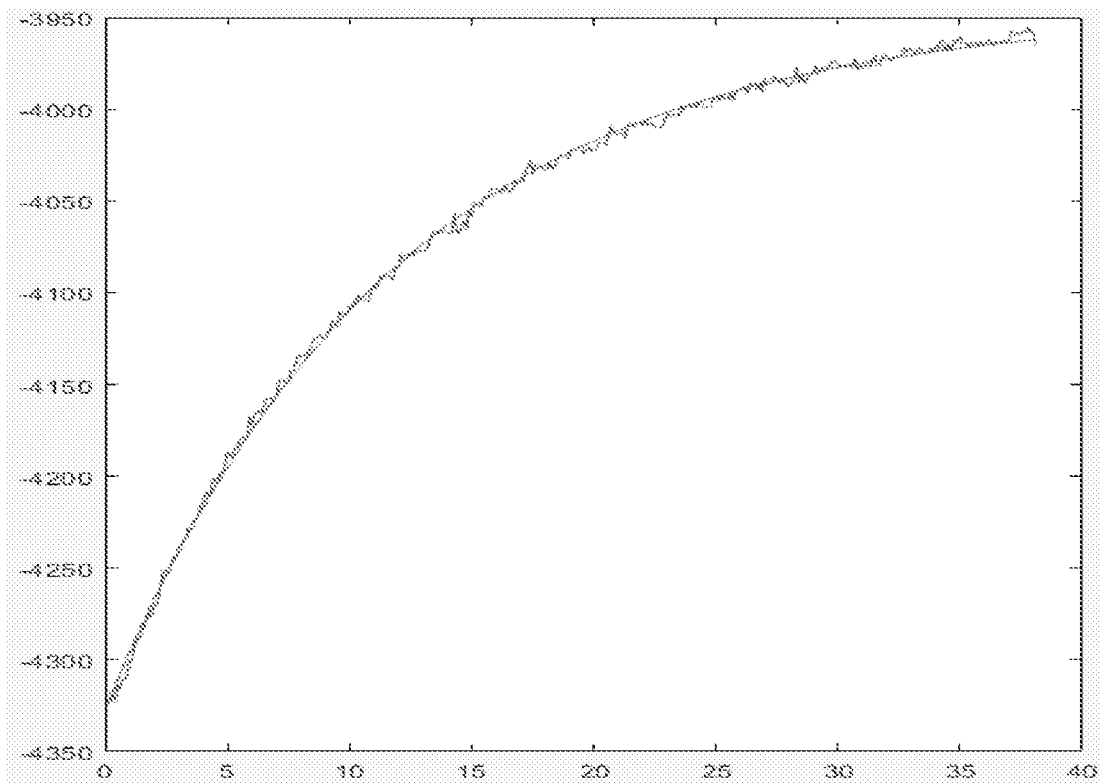
FIG. 2 shows the measured data $P_t$–t data and the least square fitting data diagram of the three models.

(6 Save the measurement data. According to the data, such as the external volume of the cigarette packet $V_1$ (m³), the final pressure of the airtight chamber $P_e$ (Pa), the measured pressure of the airtight chamber (Pa)~time t, the initial measured pressure of the airtight chamber $P_{t0}$ (Pa), utilize the formulas of the three models to calculate the data respectively, as shown in FIG. 2.

The three indicators, which are the effective air permeability "α" (unit: cm/min, i.e. CU), the effective diffusion coefficient "k" (unit: m²/s) and the effective leakage area "A" (unit: m²) of the cigarette pack, are calculated, then the seal of cigarette packet is obtained.

Repeat the above operation to test 10 cigarette packet samples, and compare the data obtained with the traditional destructive testing method (CN Patent (Publication No.: CN 104792470 A)).

Figure 3A:
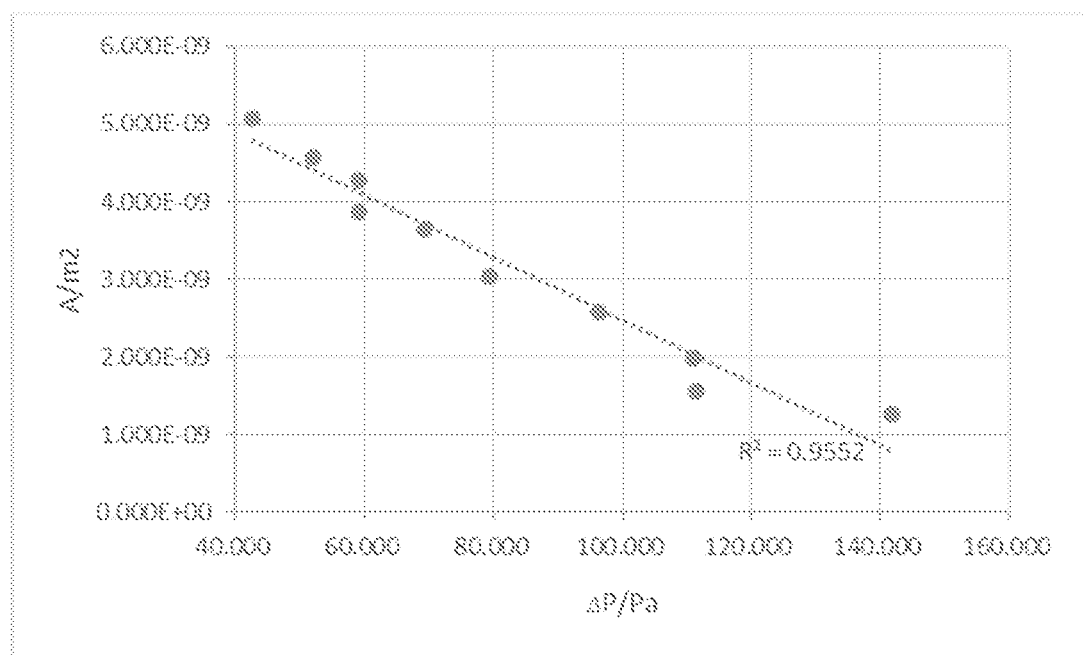
FIG. 3a shows a comparison diagram of the obtained cigarette packet's effective air permeability "α" and the result obtained by the traditional measurement method (destructive).
Figure 3B:
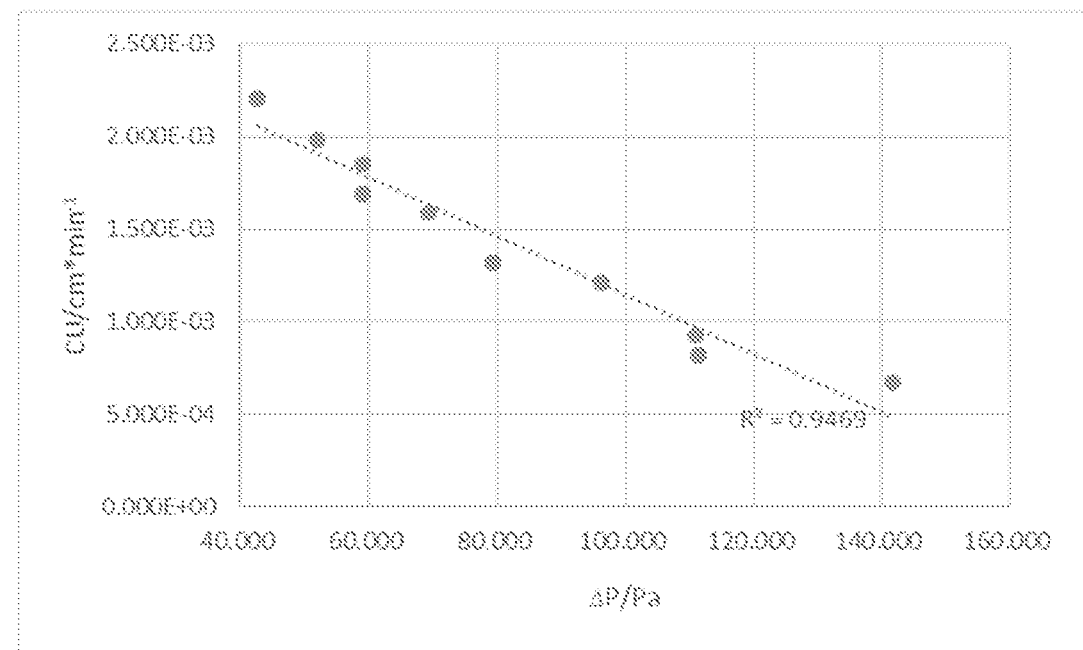
FIG. 3b shows a comparison diagram of the obtained effective diffusion coefficient "k" and the result obtained by the traditional measurement method (destructive).
Figure 3C:
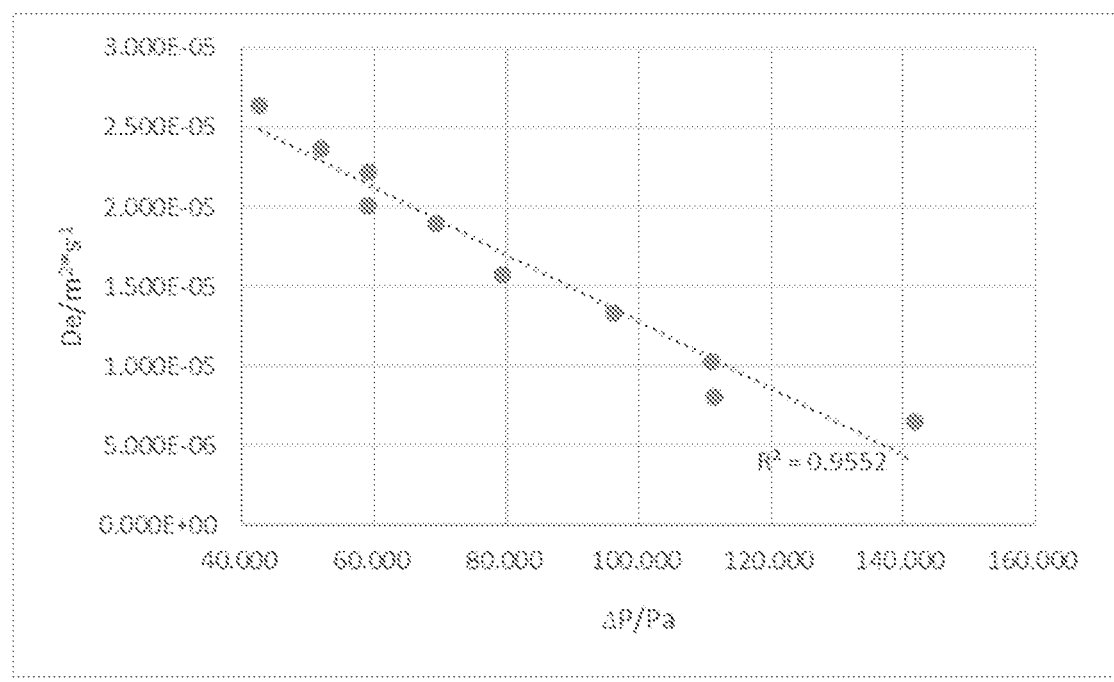
FIG. 3c shows the comparison between the obtained effective leakage area "A" of cigarette packet and the result obtained by the traditional measurement method (destructive).

Comparing the results of traditional destructive test of cigarette packet's seal (indicated by the absolute value of the pressure difference) with the three indicators of the effective air permeability of cigarette packet "α" (FIG. 3a) (unit: cm/min, namely CU), the effective diffusion coefficient of cigarette packet "k" (FIG. 3b) (unit: m²/s) and the effective leakage area of cigarette packet "A" (FIG. 3c) (unit: m²) as shown in FIG. 3, the data shows that the measurement results of the invention are in line with the traditional destructive testing data. With the reduction of the three data indicators, the seal of the cigarette packet improves.

Step (6, based on Darcy's law:

$$p_t = \frac{-p_{t0} \cdot (p_e + P_0)}{-p_e - \frac{p_e - p_{t0}}{-\frac{p_{t0}}{P_0} \cdot \exp\left(-1.67 \times 10^{-7} \cdot \alpha \cdot \frac{-p_{t0} \cdot (p_e + P_0)}{p_e - p_{t0}} \cdot \frac{A}{V_1} \cdot t\right) - 1}} - P_0$$

α: the effective air permeability of cigarette packet (cm/min); A: the surface area of cigarette packet (m²); $V_1$: the external volume of cigarette packet (m³); $P_0$: the initial pressure of cigarette packet (1.01*10⁵ Pa); $P_e$: the final pressure of the airtight chamber (Pa); $P_t$: the measured pressure of the airtight chamber (Pa); $P_{t0}$: the initial pressure (Pa) of the airtight chamber.

Step (6, based on Fick's law of diffusion:

$$p_t = p_e + (p_{t0} - p_e) \cdot \exp\left[-\frac{p_{t0}}{(p_{t0} - p_e) \cdot V_1} \cdot L \cdot k \cdot t\right]$$

k: effective diffusion coefficient of cigarette packet (m²/s); L: effective distance (m); $V_1$: external volume of cigarette packet (m³); $P_e$: final pressure of airtight chamber (Pa); $P_t$: measured pressure of airtight chamber (Pa); $P_{t0}$: the initial pressure of the airtight chamber (Pa).

Step (6, based on kinetic molecular theory:

$$p_t = p_e + (p_{t0} - p_e) \cdot \exp\left[-\frac{\sqrt{K_B T}}{\sqrt{2\pi \cdot m}} \cdot A \cdot \frac{p_{t0}}{(p_{t0} - p_e) \cdot V_1} \cdot t\right]$$

A: Effective leakage area of cigarette packet (m²), $K_B$: Boltzmann constant (1.38*10⁻²³ J/K), m: molecular mass (29*1.67*10⁻²⁷ kg); V1: external volume of cigarette packet (m³); $P_e$: the final pressure of the airtight chamber (Pa); $P_t$: the measured pressure of the airtight chamber (Pa); $P_{t0}$: the initial pressure of the airtight chamber (Pa).

At last, it should be noted that the above embodiments are only used to describe the technical solutions of the present invention and not to limit the present technical methods. The application of the present invention can be extended to other modifications, changes, applications and embodiments, and therefore it is considered all such modifications, changes, applications, and embodiments are all within the spirit and teaching scope of the present invention.

The invention claimed is:
1. A non-destructive determination method of a cigarette packet's seal, the method comprising:
   placing a cigarette packet to be tested in an airtight chamber, and quickly forming a stable negative pressure in the airtight chamber by using a balance cabin;
   continuously measuring the pressure change in the airtight chamber until it reaches equilibrium, and establishing a data model by analyzing Darcy's law, Fick's law of diffusion and a physical process of kinetic molecular theory;
   wherein, the Darcy's law is:

$$p_t = \frac{-p_{t0} \cdot (p_e + P_0)}{-p_e - \frac{p_e - p_{t0}}{-\frac{p_{t0}}{P_0} \cdot \exp\left(-1.67 \times 10^{-7} \cdot \alpha \cdot \frac{-p_{t0} \cdot (p_e + P_0)}{p_e - p_{t0}} \cdot \frac{A}{V_1} \cdot t\right) - 1}} - P_0$$

α: effective air permeability of cigarette packet (cm/min); $A_s$: surface area of cigarette packet (m²); $V_1$: external volume of cigarette packet (m³); $P_0$: initial pressure of cigarette packet (1.01*10⁵ Pa); $P_e$: final pressure of the airtight chamber (Pa); $P_t$: measured pressure of the airtight chamber (Pa); $P_{t0}$: initial pressure (Pa) of the airtight chamber;
the Fick's law of diffusion is:

$$p_t = p_e + (p_{t0} - p_e) \cdot \exp\left[-\frac{p_{t0}}{(p_{t0} - p_e) \cdot V_1} \cdot L \cdot k \cdot t\right]$$

k: effective diffusion coefficient of cigarette packet (m²/s); L: effective distance (m); $V_1$: the external volume of cigarette packet (m³); $P_e$: the final pressure of airtight chamber (Pa); $P_t$: the measured pressure of the airtight chamber (Pa); $P_{t0}$: the initial pressure of the airtight chamber (Pa); and
the kinetic molecular theory is:

$$p_t = p_e + (p_{t0} - p_e) \cdot \exp\left[-\frac{\sqrt{K_B T}}{\sqrt{2\pi \cdot m}} \cdot A \cdot \frac{p_{t0}}{(p_{t0} - p_e) \cdot V_1} \cdot t\right]$$

A: effective leakage area of cigarette packet (m²), $K_B$: Boltzmann constant (1.38*10⁻²³ J/K), m: molecular mass (29*1.67*10⁻²⁷ kg); $V_1$: the external volume of cigarette packet (m³); $P_e$: the final pressure of the airtight chamber (Pa); $P_t$: the measured pressure of the airtight chamber (Pa); $P_{t0}$: the initial pressure of the airtight chamber (Pa);

obtaining/collecting the data of the pressure and time of a sealed space; and determining following three indicators: an effective air permeability of cigarette packet "a", an effective diffusion coefficient of cigarette packet "k" and an effective leakage area of cigarette packet "A" based on the data of the collected pressure and time of the sealed space; the three indicators can independently reflect different seal, the larger the three indicators, the worse the seal.

2. The non-destructive determination method of a cigarette packet's seal according to claim 1, wherein:

a testing device used in the non-destructive determination method of a cigarette packet's seal comprises: a pressure regulating valve (2), a vacuum generator (3), a balance cabin (6), a pressure gauge (7), and an airtight chamber (9), a cigarette packet (10), a differential pressure sensor (11) and a computer (12);

one end of the vacuum generator (3) is connected with the pressure regulating valve (2), and the other end is connected with a muffler (4);

the pressure regulating valve (2) is connected to an air supply (1); and the vacuum generator (3) is sequentially connected to a first shut-off valve (5), the balance cabin (6), the pressure gauge (7), a second shut-off valve (8), the airtight chamber (9), the cigarette packet (10), the differential pressure sensor (11) and the computer (12).

3. The non-destructive determination method of a cigarette packet's seal according to claim 2, wherein:

(1 before testing, preparing a tank of the balance cabin (6) with a certain degree of vacuum, and closing the second shut-off valve (8);

(2 opening the air supply (1), opening the first shut-off valve (5), and slowly screwing the pressure regulating valve (2), meanwhile the vacuum generator (3) works and the balance cabin (6) generates negative pressure; continuing to rotate the pressure regulating valve (2) to make the pressure gauge (7) display between −3500 Pa and −5000 Pa, after a pointer of the pressure gauge (7) is stable, closing the first shut-off valve (5), and at this time, the negative pressure of the balance cabin (6) is equal to the value indicated on the pressure gauge (7);

(3 opening the airtight chamber (9), placing the cigarette packet (10) in the airtight chamber (9), and then closing and sealing the airtight chamber (9);

(4 starting the computer (12), opening a data acquisition software and connecting it to an output signal of a micro-pressure sensor (11), and setting a frequency of the acquired data to 10 Hz;

(5 clicking the data acquisition software to collect data, and then immediately opening the second shut-off valve (8) and then quickly closing it in 2 s~4 s, when the measured pressure value $P_t$ is stable, stopping collecting data, exporting and saving the data, and then opening the airtight chamber (9) and taking out the cigarette packet (10), completing the seal measurement of the cigarette packet, and continuously measuring several groups of cigarette packets (10), when the negative pressure value indicated on the pressure gauge (7) is greater than −3500 Pa, repeating step (2; and (6 saving the measurement data, the data are calculated using the three models according to the external volume $V_1$ of cigarette packet, the final pressure $P_e$ of the airtight chamber, the measured pressure $P_t$ of the airtight chamber, the time t, and the initial pressure $P_{t0}$ of the airtight chamber, to obtain the three indicators: the effective air permeability of cigarette packet "a", the effective diffusion coefficient of cigarette packet "k" and the effective leakage area of cigarette packet "A", all the three indicators can independently reflect the seal of the cigarette packets, among the three indicators, the effective air permeability of cigarette packet "α", the effective diffusion coefficient of cigarette packet "k" and the effective leakage area of cigarette packet "A" respectively represent the seal of the cigarette packets, the larger the value, the worse the seal.

4. The non-destructive determination method of a cigarette packet's seal according to claim 3, wherein:

in step (6, the above is based on Darcy's law:

$$p_t = -p_e - \frac{-p_{t0} \cdot (p_e + P_0)}{-\frac{p_{t0}}{P_0} \cdot \exp\left(-1.67 \times 10^{-7} \cdot \alpha \cdot \frac{-p_{t0} \cdot (p_e + P_0)}{p_e - p_{t0}} \cdot \frac{A}{V_1} \cdot t\right) - 1} - P_0$$

α: effective air permeability of cigarette packet (cm/min); $A_s$: surface area of cigarette packet (m²); $V_1$: external volume of cigarette packet (m³); $P_0$: initial pressure of cigarette packet (1.01*10⁵ Pa); $P_e$: final pressure of the airtight chamber (Pa); $P_t$: measured pressure of the airtight chamber (Pa); $P_{t0}$: initial pressure (Pa) of the airtight chamber.

5. The non-destructive determination method of a cigarette packet's seal according to claim 3, wherein:

in step (6, the above is based on Fick's law of diffusion:

$$p_t = p_e + (p_{t0} - p_e) \cdot \exp\left[-\frac{p_{t0}}{(p_{t0} - p_e) \cdot V_1} \cdot L \cdot k \cdot t\right]$$

k: effective diffusion coefficient of cigarette packet (m²/s); L: effective distance (m); $V_1$: external volume of cigarette packet (m³); $P_e$: final pressure of airtight chamber (Pa); $P_t$: measured pressure of airtight chamber (Pa); $P_{t0}$: initial pressure of the airtight chamber (Pa).

6. The non-destructive determination method of a cigarette packet's seal according to claim 3, wherein:

in step (6, the above is based on the molecular kinetic theory:

$$p_t = p_e + (p_{t0} - p_e) \cdot \exp\left[-\frac{\sqrt{K_B T}}{\sqrt{2\pi \cdot m}} \cdot A \cdot \frac{p_{t0}}{(p_{t0} - p_e) \cdot V_1} \cdot t\right]$$

A: effective leakage area of cigarette packet (m²), $K_B$: Boltzmann constant (1.38*10⁻²³ J/K), m: molecular mass (29*1.67*10⁻²⁷ kg); $V_1$: external volume of cigarette packet (m³); $P_e$: final pressure of the airtight chamber (Pa); $P_t$: measured pressure of the airtight chamber (Pa); $P_{t0}$: initial pressure of the airtight chamber (Pa).

* * * * *